United States Patent [19]

Mizuhara

[11] Patent Number: 4,459,264

[45] Date of Patent: Jul. 10, 1984

[54] REACTIVE METAL-PALLADIUM-SILVER BRAZING ALLOYS

[75] Inventor: Howard Mizuhara, Hillsborough, Calif.

[73] Assignee: GTE Products Corporation, Stamford, Conn.

[21] Appl. No.: 475,263

[22] Filed: Mar. 14, 1983

[51] Int. Cl.$^3$ ............................................. C22C 28/00
[52] U.S. Cl. ................................. 420/505; 420/501; 228/263.12; 219/85 H; 428/606
[58] Field of Search ................ 420/505, 501; 148/430, 148/431; 228/263.12, 263.11, 56 R; 219/85 H, 146, 22; 428/606

[56] References Cited

FOREIGN PATENT DOCUMENTS

| | | | |
|---|---|---|---|
| 57-115997 | 7/1982 | Japan | 219/85 H |
| 0477804 | 8/1975 | U.S.S.R. | 420/505 |

Primary Examiner—L. Dewayne Rutledge
Assistant Examiner—Debbie Yee
Attorney, Agent, or Firm—Donald R. Castle

[57] ABSTRACT

Reactive metal-palladium-silver are suitable for brazing ceramics, other non-metallic and metallic materials.

4 Claims, No Drawings

REACTIVE METAL-PALLADIUM-SILVER BRAZING ALLOYS

FIELD OF THE INVENTION

This invention relates to brazing alloys. More particularly it relates to brazing alloys containing a reactive metal, palladium and silver.

BACKGROUND

Alloys containing titanium are known. These alloys contain relatively high levels of titanium. Generally the titanium content is above about 7% by weight. These alloys are not ductile and can not be rolled to a foil in a satisfactory manner and upon brazing contain a brittle dispersed phase.

With regard to brazing a ceramic material to a metal member, the reliability of the brazed joint is good when the brazing alloy is ductile. A ductile alloy is necessary because of the thermal expansion mismatch between metal and ceramic members.

SUMMARY OF THE INVENTION

Reactive metal alloys containing specified amounts of palladium and silver are ductile and after brazing are relatively free of hard dispersed phases.

DETAILS OF PREFERRED EMBODIMENT

For a better understanding of the present invention, together with other and further objects, advantages and capabilities thereof, reference is made to the following disclosure and appended claims in connection with the above description of some of the aspects of the invention.

The amount of the reactive metal in the alloys of this invention which also contains palladium and silver cannot appreciably exceed about 5% by weight and achieve a ductile material which upon brazing is free of dispersed phases.

The amount of reactive metal in the alloys of this invention is from 0.05% by weight to about 5% by weight, with from about 1% by weight to about 3% by weight being preferred. By reactive metal, within the context of this disclosure, is meant titanium, zirconium, vanadium and mixtures thereof. While titanium generally is the preferred reactive metal, alloy compositions of Ti-Zr and Ti-V are equally effective.

The weight percent of palladium, can vary from about 5 by weight to about 25% by weight. The percent level is generally from about 10% by weight to about 20% by weight.

The balance of the alloy is silver hence can be present in amounts of from about 71% by weight to about 94.9% by weight.

Various alloys are prepared by skull melting using a tungsten electrode and an argon atmosphere. The alloys are ductile and are rolled to foils using an intermediate vacuum anneal. The thickness of the foil is of from about 2 to 6 mils.

The compositions of the alloys and their flow temperatures are given in Table 1.

TABLE 1

| Alloy | Element (% by weight) | | | Melting Point °C |
|---|---|---|---|---|
| | Ti | Pd | Ag | |
| 1 | 2 | 10 | 88 | 1065 |
| 2 | 2 | 20 | 78 | 1160 |

The alloys are suitable for a variety of brazing applications. For example these alloys are useful for brazing ceramics to ferrous base alloys such as brazing alumina to an iron-nickel-cobalt alloy known as Kovar, a trademark of Westinghouse Electric Corporation; for brazing superalloys such as the nickel-iron-chromium alloy Inconel, a trademark of International Nickel Co. and for brazing stainless steel such as 304 stainless steel.

EXAMPLE 1

A mil foil of about 20% Pd, 78% Ag, 2% Ti alloy is placed between a 97.5% alumina body produced and sold by WESGO Division of GTE Products Corporation under the trademark of AL-300, and a Kovar metallic sheet and is brazed under $10^{-5}$mm Hg at about 1180° C. The alloy melts and brazes the alumina body to the metal sheet with excellent results. Another Kovar sheet is placed on the opposite face of the same alumina body with a 2 mil foil of about 10% Pd, 88% Ag, 2% Ti, placed therebetween. The total assembly is heated to about 1085° C. in a $10^{-5}$mm Hg vacuum resulting in a second successful braze on a same assembly without melting the original braze. The technique is called step brazing; additional brazes can be carried out using lower temperature brazing alloys on the same assembly.

EXAMPLE 2

A 2 mil foil of about 20% Pd, about 78% Ag, about 2% Ti alloy is placed between alumina body containing 97.5% $AL_2O_3$ produced and sold by WESGO Division of GTE Products Corporation under the trademark of AL-300 and a Kovar thin tubing cut perpendicular to length with dimensions of 0.250" long by 0.250" diameter with 10 mil wall thickness. A vacuum furnace is pumped down to $10^{-5}$mm Hg vacuum, and when the temperature reaches about 900° C., dry argon gas is introduced to a vacuum of 10mm Hg and the temperature is raised to about 1200° C. to braze. A second Kovar face is brazed to an AL-300 alumina disc using a 2 mil foil of 10% Pd, 88% Ag, 2% Ti alloy, between the alumina disc and Kovar tubing. Using the same argon back-filling technique the second face is brazed at 1090° C. The purpose of back-filling is to control the evaporation of silver.

EXAMPLE 3

Four AL-300 ceramic rings of equal size, 2" O.D. by ¼" long by 0.100" wall thickness are stacked with 2 mil thick alloys preforms, with a dimension of 2" O.D. by 1.8" I.D. The alloy is about 10% Pd, about 88% Ag, about 2% Ti. A graphite fixture is used to keep the 4 cylinders in alignment. The graphite fixture is undercut opposite the braze alloy placement to prevent wetting of graphite by the alloy. The brazing is done by back-filling to 50mm Hg using dry argon and using a braze temperature of about 1090° C. The vacuum check of the brazed assembly shows that the braze joint is hermetically sound.

While there has been shown and described what are at present considered the preferred embodiments of the invention, it will be obvious to those skilled in the art that various changes and modifications may be made therein without departing from the scope of the invention as defined by the appended claims.

What is claimed is:

1. A brazing alloy consisting essentially of from about 0.05% to about 5% by weight of a reactive metal selected from the group consisting of titanium, vanadium, and mixtures thereof, from about 5% by weight to about 25% by weight of palladium, balance silver.

2. An alloy according to claim 1 wherein said reactive metal is titanium.

3. An alloy according to claim 2 wherein palladium is present in amounts of from about 10% to about 20% by weight.

4. An article consisting essentially of a ductile brazing foil having a composition consisting essentially of from about 0.5% to about 5% by weight of a reactive metal selected from the group consisting of titanium, vanadium, zirconium and mixtures thereof, from about 5% to about 25% by weight of palladium, balance silver.

* * * * *